(12) United States Patent
Bettis et al.

(10) Patent No.: US 7,738,833 B2
(45) Date of Patent: *Jun. 15, 2010

(54) PROVISION OF MESSAGING SERVICES FROM A VIDEO MESSAGING SYSTEM FOR VIDEO COMPATIBLE AND NON-VIDEO COMPATIBLE EQUIPMENT

(75) Inventors: Sonny R. Bettis, Lawrenceville, GA (US); Ian M. Moraes, Suwanee, GA (US); Jon S. Plotky, Lawrenceville, GA (US); Philip L. Lowman, Ellijay, GA (US); James H. Spencer, Tucker, GA (US)

(73) Assignee: Glenayre Electronics, Inc., Duluth, GA (US)

( * ) Notice: Subject to any disclaimer, the term of this patent is extended or adjusted under 35 U.S.C. 154(b) by 1159 days.

This patent is subject to a terminal disclaimer.

(21) Appl. No.: 11/307,577

(22) Filed: Feb. 13, 2006

(65) Prior Publication Data

US 2007/0058681 A1 Mar. 15, 2007

Related U.S. Application Data

(63) Continuation-in-part of application No. 11/170,530, filed on Jun. 29, 2005.

(51) Int. Cl.
*H04H 60/09* (2008.01)
(52) U.S. Cl. ............... 455/3.04; 455/412.1; 455/414.1; 370/493

(58) Field of Classification Search ............... 370/351, 370/389, 400, 401, 464, 480, 493; 455/403, 455/414.1, 3.01, 3.03, 3.04; 709/204, 206
See application file for complete search history.

(56) References Cited

U.S. PATENT DOCUMENTS

| | | | | |
|---|---|---|---|---|
| 2001/0003469 | A1* | 6/2001 | Emomoto et al. | 348/705 |
| 2004/0119814 | A1* | 6/2004 | Clisham et al. | 348/14.08 |
| 2004/0133647 | A1 | 7/2004 | Ozkan et al. | |
| 2004/0203648 | A1* | 10/2004 | Wong | 455/414.1 |
| 2005/0030977 | A1 | 2/2005 | Casey et al. | |
| 2005/0251832 | A1 | 11/2005 | Chiueh | |
| 2006/0029051 | A1 | 2/2006 | Harris et al. | |
| 2006/0262227 | A1* | 11/2006 | Jeong | 348/723 |
| 2007/0064743 | A1* | 3/2007 | Bettis et al. | 370/503 |

OTHER PUBLICATIONS

Koster, Pascal, "You Have Video Mail," Telecommunications Online, Feb. 2005 (retrieved on Feb. 28, 2008 from the Internet using URL: http://telecommagazine.com/International/article. asp?HH_ID=AR_498, entire document and especially paragraphs 1-4.

* cited by examiner

*Primary Examiner*—Chi H Pham
*Assistant Examiner*—Weibin Huang
(74) *Attorney, Agent, or Firm*—Gregory Scott Smith

(57) ABSTRACT

A telecommunications system that supports the provision of video messaging, yet maintains compatibility and operation with user equipment that is not capable of processing, receiving or rendering video content. Based on the type of user equipment, as well as user selected options, network configurations and status, and class-of-service characteristics, the telecommunications systems can revise the manner in which content is provided to the user equipment. Variations in the content provision include providing synchronized audio and video content, audio content only, video content only, video content with closed-captioning and closed-captioning only.

19 Claims, 10 Drawing Sheets

Fig. 4

PROVISION OF MESSAGING SERVICES FROM A VIDEO MESSAGING SYSTEM FOR VIDEO COMPATIBLE AND NON-VIDEO COMPATIBLE EQUIPMENT

CROSS-REFERENCE TO RELATED APPLICATIONS

This application is a continuation-in-part of U.S. patent application filed on Mar. 15, 2005 and assigned Ser. No. 11/080,744, U.S. patent application filed on Jun. 29, 2005 and assigned Ser. No. 11/170,459, and U.S. patent application filed on Jun. 29, 2005 and assigned Ser. No. 11/170,530, each of which claim the benefit of the filing date of U.S. Provisional Application for patent entitled DISTRIBUTED IP ARCHITECTURE FOR TELECOMMUNICATIONS SYSTEM, filed on Jun. 30, 2004 and assigned Ser. No. 60/584,117.

This application is related to a U.S. patent application that has a title of DISTRIBUTED IP ARCHITECTURE FOR TELECOMMUNICATIONS SYSTEM WITH VIDEO MAIL, was filed concurrently with this application and is hereby incorporated by reference in its entirety.

BACKGROUND OF THE INVENTION

The present invention relates to the provision of messaging services from a video messaging system when the messaging services are requested from a variety of device types, some of which include video messaging capabilities and some of which do not. As with the emergence of most new technologies in which similar, less feature rich systems are already in use on a wide-scale basis, it is greatly desirable to have backward compatibility. Backward compatibility does not restrict early adopters of a new technology from immediately reaping the benefits of that technology; however, it allows slower adopters to continue the use of their equipment while deciding if and when they want to migrate to the new technology. The cellular technology arena is a very applicable example of the need for backward compatibility.

Cellular technology has been experiencing a rapid growth rate since its inception in the early 1980s. As the use of cellular technology has grown, the capabilities required for cellular technology have also grown. These requirements have been met my tremendous advancements in cellular technology. In its early years, cellular technology was based on analog transmission technology with limited bandwidth. Today, cellular technology has migrated to complex digital technology with bandwidths that enable the delivery of broadband services. The third generation wireless infrastructure (3G) has enabled the ability to transmit, receive and render video content using a handheld portable device. One result of this advancement in technology has been the deployment or anticipated deployment of systems such as the ICE telecommunications platform developed by Glenayre Electronics Inc. as described in the above-identified related patent application. The described telecommunications system allows for the creation, reception, storage and provision of video messaging and video content. Thus, a user can receive and provide video messaging content utilizing their subscriber unit—such as a 3G compatible handset.

A problem with backwards compatibility arises when a user of the cellular system utilizes a device that does not support video messaging. It should be understood that video messaging refers to content that includes video information and may include audio information associated with that message. For instance, if user A leaves a video mail message for user B, user B may be prevented from retrieving that video mail message if he or she is using a device that does not support video content. This would certainly defeat a goal of providing backwards compatibility and in essence, would isolate adopters of the new technology from those utilizing prior technology. Furthermore, this would also have the effect of restricting or diluting the capabilities attained by the advancement of technology. For instance, if achieving backwards compatibility could only be attained by limiting the messages to a format that was compatible with older technology, then early adopters would not reap the benefit of the new technology.

Thus, there is a need in the art for a system that exploit the advancements in technology for the provision and support of video messaging without isolating early adopters from the existing subscriber base and, still allowing the early adopters to fully exploit the new technology.

BRIEF SUMMARY OF THE INVENTION

The present invention allows the system to support phones that are video ready (eg. 3G phones) and those that are not (eg. 2G phones). In one embodiment, when a call is detected, if the phone is video ready, then video support or content is provided, otherwise just audio is provided. One aspect of the invention is the allowance for 2 streams to be presented to a video media server—audio and video. The streams are deposited into a memory storage device and may include synchronization information, such as an RTP stamp, to enable the synchronization during playback. The user can playback audio, video or both depending on the type of user equipment and the user's options. The user may also have video with closed captioning using an audio to text conversion during playback. The user can optionally switch between modes.

BRIEF DESCRIPTION OF THE SEVERAL VIEWS OF THE DRAWING

Various aspects, features and advantages of the present invention will become fully appreciated as the same becomes better understood when considered in conjunction with the accompanying drawings, in which like reference characters designate the same or similar parts throughout the several views, and wherein:

FIG. 4 is a screen shot of an exemplary subscriber provisioning screen that can be incorporated into an embodiment of the present invention.

DETAILED DESCRIPTION OF THE INVENTION

Figure 1:
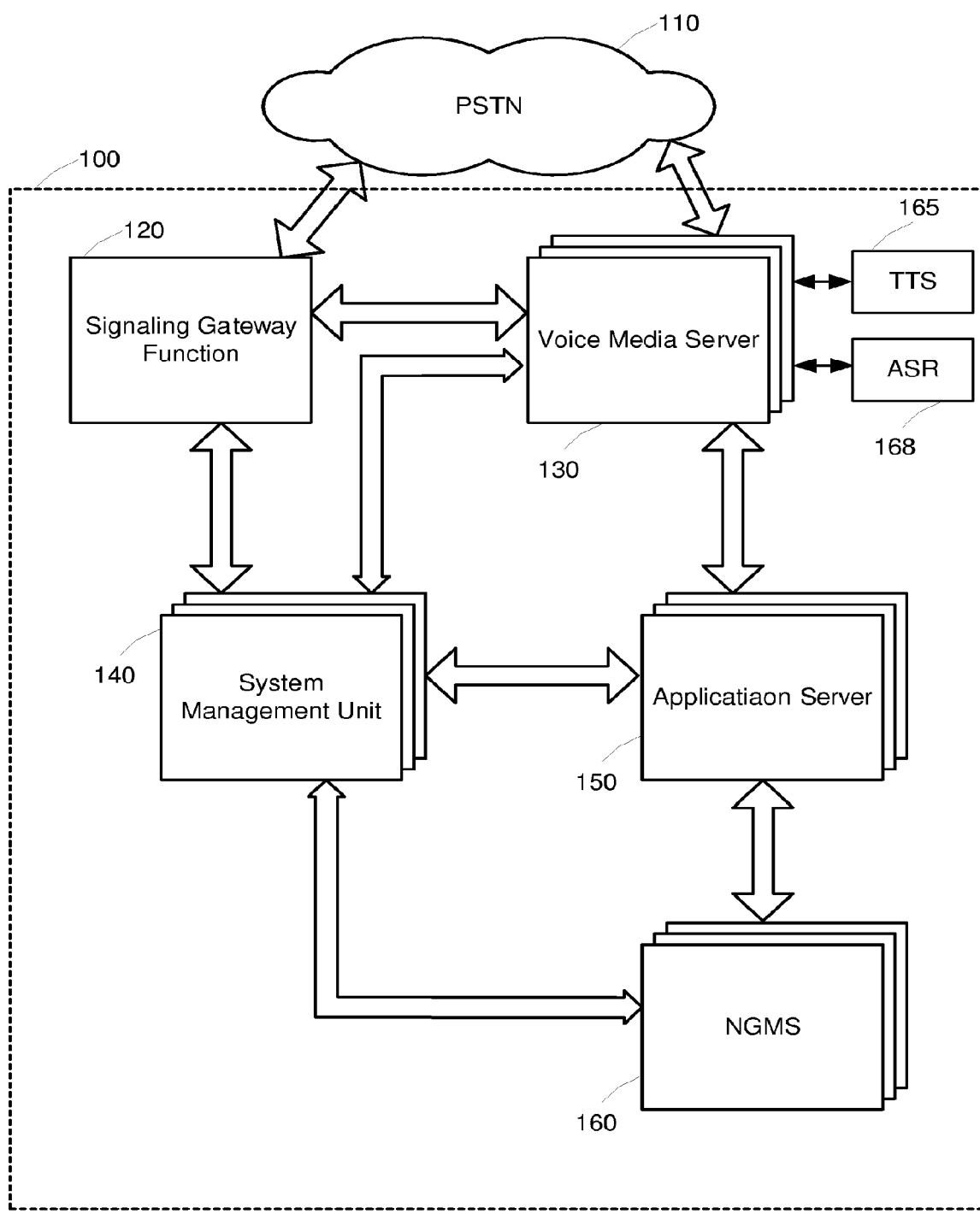
FIG. 1 is a system diagram illustrating the components and the connectivity of an exemplary next-generation communications platform of the present invention.

The present invention provides a telecommunications platform that meets the above-described needs in the art by fully enabling early adopters of advanced cellular or wireless technology to exploit the available capabilities but, is also supportive of less sophisticated technology and thus, maintains backwards compatibility. More specifically, the present invention is a video messaging telecommunications platform that supports subscriber units that are video ready (such as 3G devices) and those that are not (such as 2G devices or other devices). When the call is detected, if the initiating device is video ready, video support and features are provided to that device. Otherwise, the support is limited to a level that is compatible with the initiating device. For instance, the support may simply include the provision of audio features. In one embodiment, the present invention allows for two streams to be presented to the telecommunications platform—an audio stream and a video stream. The streams are deposited into a memory storage device and includes a mechanism to maintain synchronization of the two streams, such as utilizing a Real-Time Transport Protocol (RTP) stamp. This embodiment of the invention allows a user to receive or provide audio, video or both depending on the type of equipment the user is using and the user's options or services. Another aspect of the present invention is to allow a to receive video messaging without the rendering audio by enabling closed captioning using an audio to text conversion during playback. Another aspect of the present invention is to allow a user to optionally switch between modes of operation (i.e., video only, audio only, video with closed captioning, closed captioning only, etc.). Another aspect of the present invention is to enable synchronization of the audio and video content available on the telecommunications platform.

The present invention can be deployed on a distributed IP architecture, also described as a next-generation communications platform, for telecommunications equipment, such as a PBX, voicemail system, or the like, that supports the provision of video mail. The system architecture described herein provides a platform that supports the provision of video mail, along with various aspects and features of the service, for the new third generation wireless technology. Furthermore, by utilizing the architecture of the present invention, the various functionalities of the telecommunications equipment, including the provision of video mail, can be divided amongst various physical components and the physical components can be geographically dispersed. Each of the components communicates with each other, as needed, through independent interfaces to an IP network. The interface to third generation wireless network is provided through a transcoding gateway. The complexities of interfacing to the telephone network are handled through a single gateway component and a simplified protocol is used for communication between the remaining components of the telecommunications equipment or to the telephone network through the gateway component. However, it will be appreciated that although the present invention is described as residing on such a platform, the present invention is not limited to deployment on this platform and various aspects of the invention can be incorporated into other systems or platforms.

Now turning to the drawings, in which like labels refer to like elements throughout the several views, various aspects and features of the present invention are described.

FIG. 1 is a system diagram illustrating the components and the connectivity of an exemplary next-generation communications platform in which aspects of the present invention could be incorporated. In the illustrated embodiment, the next-generation communications platform 100 employs a distributed IP architecture and is connected to the Public Switched Telephone Network (PSTN) 110. The communications platform 100 is illustrated as including a signaling gateway function (SGF) 120, one or more media servers (MS) 130, one or more system management units (SMU) 140, one or more application servers (AS) 150 and one or more next generation message stores (NGMS) 160.

In general, the SGF 120 serves as the Signaling System 7 (SS7) interface to the PSTN 110 and allows one or more components or sub-systems to share the same point code (thereby reducing the need for destination point codes (DPC) and signaling links for call-control. This makes the telephonic system appear as single trunk group in the network, although sharing the same point code does not necessarily mean all the trunks are in a single trunk group. The media server 130 terminates IP and/or circuit switched traffic from the PSTN via a multi-interface design and is responsible for trunking and call control. The application server module 150 generates dynamic VoiceXML pages for various applications and renders the pages through the voice media server 130 and provides an external interface via a web application server configuration. The SMU 140 is a management portal that enables service providers to provision and maintain subscriber accounts and manage network elements from a centralized web interface. The NGMS 160 stores voice messages, subscriber records, and manages specific application functions including notification.

The voice media server 130 terminates IP and circuit-switched voice traffic and is responsible for call set up and control within the Vsystem. The voice media server 130 processes input from the user in either voice or DTMF format (much like a web client gathers keyboard and mouse click input from a user). It then presents the content back to the user in voice form (similar in principle to graphic and text display back to the user on a PC client). This client server methodology enables rapid creation of new applications and quick utilization of content available on the World Wide Web.

The V voice media server 130 processes incoming calls via requests to the application server 150 using HTTP. A load balancer directs traffic arriving at the voice media server 130 to one of a plurality of applications servers 150. This functionality ensures that traffic is allocated evenly between servers, and to active servers only. The voice media server 130 works as the VoiceXML client on behalf of the end user in much the same manner as a client like Netscape works on behalf of an HTML user on a PC. A VoiceXML browser residing on the voice media server 130 interprets the VoiceXML documents for presentation to users.

The voice media server 130 interfaces with the PSTN, automatic speech recognition server (ASR) 168 and text-to-speech server 165 (TTS) and provides VoIP (SIP, H.323)

support. Incoming circuit switched voice data in 64-kilobit micro-law or A-law pulse code modulation (PCM) format is compressed using G.726 for voice storage in the NGMS 160. VoIP is supported through G.711 and G.723 voice encoding. The voice media server 130 contains a built-in abstraction layer for interface with multiple speech vendors—eliminating dependency on a single ASR 168 or TTS 165 vendor.

The voice media server 130 can include built in codecs and echo cancellation. Call detail records (CDRs), used by service providers for billing purposes, are provided as well as SNMP alarming, logging, and transaction detail records.

Each of these sub-systems are described in more detail in the U.S. patent application Ser. No. 11/080,744 which was filed on Mar. 15, 2005 and to which this present application is a continuation-in-part and thus, is incorporated herein by reference.

Figure 2:
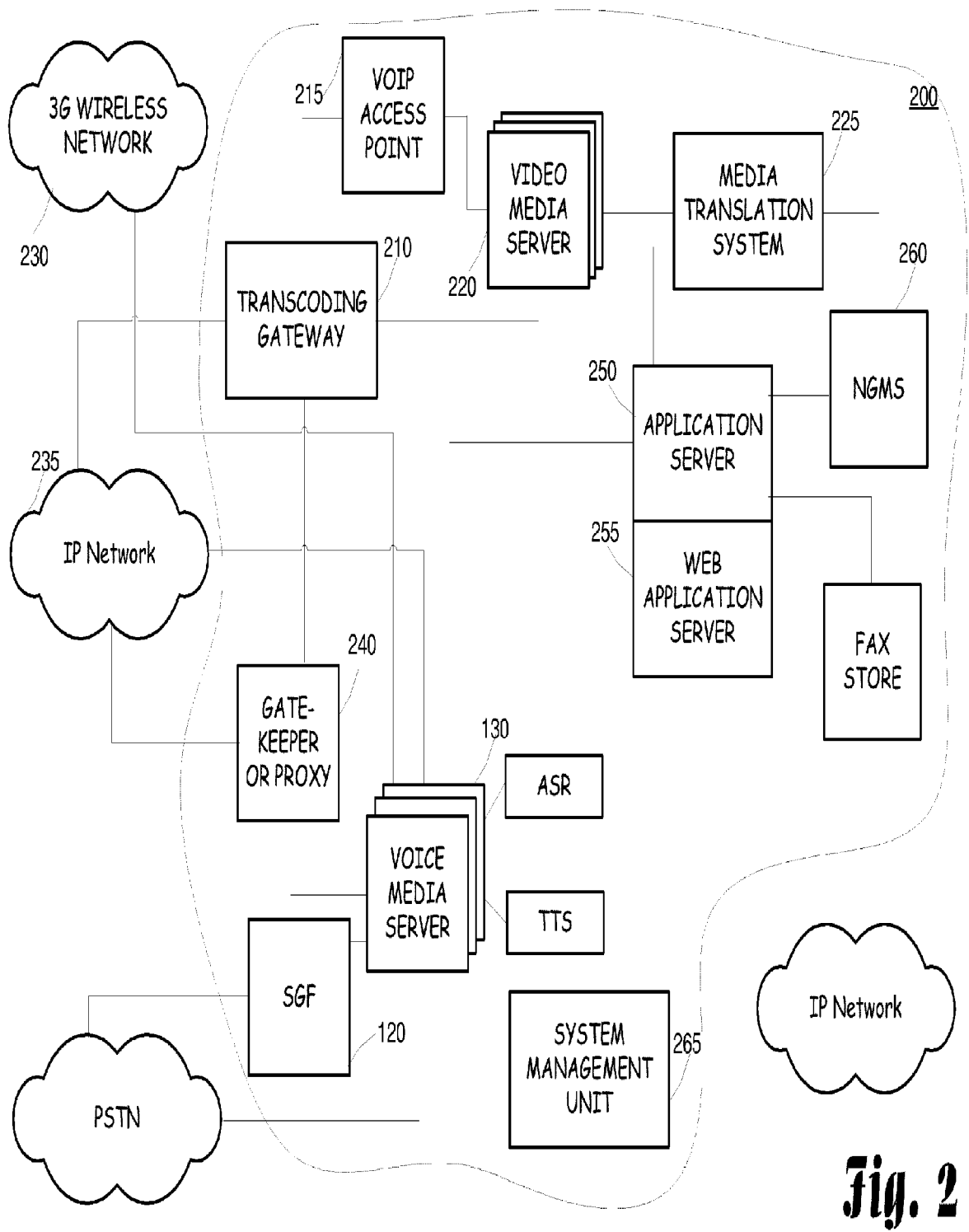
FIG. 2 is a block diagram illustrating a distributed telecommunications platform that incorporates elements to provide video mail capabilities.

FIG. 2 is a block diagram illustrating a distributed telecommunications platform that incorporates elements to provide video mail capabilities. The illustrated embodiment is shown as adding elements to the distributed telecommunications platform as illustrated in FIG. 1. However, it should be appreciated that although this embodiment may be inventive in and of itself, other aspects and elements of the invention can be implemented in other embodiments as well.

In general, video mail is implemented in the telecommunications platform by including a transcoding gateway 210, a voice over IP access point (VOIP access point or VAP) 215, one or more video mail servers 220, and a media translation engine 225. The transcoding gateway 210 interfaces to a third generation wireless network (3G wireless network) 230 over an E1 interfaces that supports the H.324M and 3G-324M protocols. In addition, the transcoding gateway interfaces to an IP network 235 over an H.323 interface and to the video media server 220 over another H.323 interface.

The transcoding gateway 210 is used to process incoming video messaging traffic and it physically resides between the networks (3G, IP, PSTN) and the video media server 220. The transcoding gateway 210 utilizes both E1 and IP interfaces to the networks and in an exemplary embodiment, interfaces to the video server 220 over an IP interface. In an embodiment of the present invention, the transcoding gateway 210, operates to provide transcoding and proxy functions for call signaling, call setup, command, control and indication between various multimedia systems standards including H.324M/3G-324M, H.323 and SIP. The transcoding gateway 210 preferably supports multiple voice and video codecs. The transcoding gateway 210 is operable to automatically handle clients by: detecting capabilities of client and matching and converting command and control media session announcements. In addition, the transcoding gateway 210 enables universal media experience by including capabilities exchange and mode selection to support a wide variety of devices, handsets and suppliers without the need for customization of the network.

One advantage of using a transcoding gateway 210 is that the video telephony calls are always presented to the video media server 220 in a single audio/video format. Thus, the video media server 220 does not need to provide any transcoding capabilities. Another advantage is that the transcoding gateway 210 performs all the error handling on the interfaces to the network. Thus the video media server 220 is never required to recreate full video frames from the video data stream. These two advantages allow the interface of video media server 220 to be simpler and thus, the video media server 220 will be less expensive yet able to handle more simultaneous calls. The transcoding gateway 210 can be proprietary or one of the commercially available products such as the one available from DILITHIUM NETWORKS (the DTG 2000), which provides up to eight E1 interfaces, as well as IP network interfaces.

Another potential advantage to using a transcoding gateway is that some network operators already have them deployed in their networks to provide calling capabilities between the 3G and IP networks. Thus, in deploying embodiments of the present invention, the systems could exploit the existing transcoding gateways.

The VOIP access point 215 operates to balance traffic across the video mail servers 220. More specifically, the VOIP access point 215 distributes calls received at the transcoding gateway 210 to one of the video media servers 220 in such a manner to balance the load between the available video media servers 220.

The voice media server 220 operates to terminate IP video traffic and is responsible for call set up and control of video telephony or otherwise provide the management of any video messages within the system. The voice media server 220 processes input from the user in DTMF format (much like a web client gathers keyboard and mouse click input from a user). It then presents content to the user in video and voice form (similar in principle to graphic and text display back to the user on a PC client). This client server methodology enables rapid creation of new applications and quick utilization of content available on the World Wide Web. In an exemplary embodiment, each voice media server 220 includes a client interface for callers and supports voiceXML and Java Script. The application environment for the video mail servers 220 is similar to that as described for the voice media servers 130 in FIG. 1. Each voice media server 220 can support approximately between 30-60 simultaneous video calls. Further features of an exemplary voice media server 220 include providing call data records, logging and alarm management, telephony management functions, and host media processing.

When a video call is received by the system, the voice media server 220 answers the call just as if it were a video-capable terminal. No special client is required on the caller's videophone. The voice media server 220 prompts the caller with both voice prompts and video displays. When recording a message, the voice media server 220 captures both the video and audio data, keeping the data synchronized for playback.

The voice media server 220 processes incoming calls via requests to the applications server 250 using HTTP. A load balancer directs traffic arriving at the voice media server 220 to one of a plurality of applications servers 250. This functionality ensures that traffic is allocated evenly between servers, and to active servers only. The voice media server 220 works as the VoiceXML client on behalf of the end user in much the same manner as a client like Netscape works on behalf of an HTML user on a PC. A VoiceXML browser residing on a Video Media Server interprets the VoiceXML documents for presentation to users.

The voice media server 220 interfaces with transcoding gateway 210 using H.323. The transcoding gateway 210 translates the various audio and video codecs used in 3G-324M and H.323 to G.711 audio and H.263 video for the voice media server 220. The VoIP Access Point (VAP) acts as a load balancer to direct incoming calls among the available voice media servers 220. Each voice media server 220 constantly communicates its status to the VAP. The VAP routes calls only to voice media servers 220 that are running and ready for traffic. Call Detail Records (CDRs) are provided, as well as SNMP alarming, logging, and transaction detail records.

The application server 250 operates to generate dynamic voice XML (VXML) pages or information, manages application processing of any video content and includes an external interface through the web application server 255. The application server 250 interfaces to both the video media servers 220 and the voice media servers 130 and, in response to various requests received from the video media servers 220 and the voice media servers 130, generates appropriate VXML pages or data. Utilizing a web application infrastructure, the application server 250 interfaces with backend data stores (such as the NGMS 260 or user profile databases, content servers or the like). The utilization of the web application infrastructure allows for separation of the core service logic (i.e., providing the business logic) from the presentation details (VXML, CCXML, SALT, XHTML, WML) to provide a more extensible application architecture.

In an exemplary embodiment, the applications server 250 utilizes Java 2 Enterprise Edition (J2EE) environment and Java Server Pages (JSP) to create the dynamic VoiceXML pages for the media servers. To create an environment for easy application development, the applications server 250 supports Template+ JSPs. Applications are implemented in JSPs using a proprietary API. These JSPs are readily modifiable making changes in application behavior and creation of new applications very easy.

The NGMS 260 is utilized to store voice and video messages, subscriber records, and to manage certain application functions such as notification schedules. The NGMS 260 is preferably designed with fully redundant components and utilizes reflective memory and Redundant Array of Independent Disks (RAID) technology for fault tolerance, immediate fail over and recovery.

The NGMS has notification interfaces to SMPP for SMS, SMTP for email, and SMS Alert enabling SMS direct to the handset over SS7.

The media translation engine 225 operates to translate message data between different types of encoding. For instance, the media translation engine 225 can operate to convert message data between voice and data formats and encodings. One aspect of the media translation engine 225 is that it enables the playback of video messages on a device or telephone that does not support video, as well as the playback of voice only messages on video based calls. The media translation engine 225 also provides conversion for web message access and email message delivery. Preferably, the media translation engine 225 includes a dedicated digital signal process for high throughput.

The system management unit (SMU) 265 communicates with each of the other elements and/or components in the system to provide provisioning services, alarm management and collection of customer data records (CDR). The SMU provides a centralized point for service providers to manage all network elements, providing remote access, maintenance, and backup functionality. As such, the system management unit 265 provides system configuration and setup, network management and system monitoring, statistics and reporting, fault management and alarms, subscriber and mailbox administration, computer interface for centralized provisioning, CDR capture for billing, as well as other services.

The SMU 265 provides a single interface for provisioning, alarming, reports, and subscriber migration. The SMU 265 integrates and customizes systems with new elements and applications, and provides operational support and network management functions for carriers experiencing swiftly growing networks and exploding traffic volumes. Core features of the element management component include:

Element Auto-Discovery—when service providers add new network elements, the SMU 265 automatically recognizes them and includes the new elements in the graphical network map.

Graphical Network Map—a network/cluster map and map editor provides a snapshot of the entire network or cluster and facilitates quick problem identification and resolution.

Time Synchronization—a central time source ensures all network components maintain a uniform time reference across the entire messaging network—important for any distributed architecture.

Centralized network logging—logging for the entire Versera messaging network is centralized on the SMU.

For system configuration and setup, the SMU 265 supports the functions of Class of Service (COS), software configuration and setting up and initializing system parameters. The network management and system monitoring aspect of the SMU 265 supports the functions of real-time system monitoring of hardware and software, tracking of resource usage and monitoring traffic statistics and load. The SMU 265 also provides statistics and reporting through supporting standard built-in reports, custom reports and usage and loading reports. The SMU 265 provides fault management and alarms by supporting a centralized logging and reporting of faults, alarms in real time and discovery functions. Subscriber and mailbox administration is provided in the SMU 265 through supporting the ability to add, delete, modify, query and configure subscriber records, defining features on a subscriber basis and maintaining subscriber records and COS creation. The SMU 265 provides a computer interface for centralized provisioning including automated provisioning directly from external billing/provisioning systems via a flexible key-word interface.

In a particular embodiment, the SMU 265 is deployed on a telco-grade Intel server, Red Hat Linux™ operating system utilizing an open-source MySQL™ database structure for maximum supportability.

The SMU 265 uses a dual processor computer and allows remote dial-in for access to the SMU 265 as well as all other servers in the system via Telnet. Backup of system configurations and other critical data is also accomplished via the SMU 265.

The next generation message store (NGMS) 260 operates to store voice messages, video messages and subscriber records, as well as manages specific functions including notification. Thus, in the illustrated embodiment, the NGMS 260 provides storage for both voice and video messages. The system can employ the use of multiple NGMS components to increase the memory size and the number of subscribers that can be supported.

The SGF 120 offers a consolidated SS7 interface creating a single virtual SS7 signaling point for the system. SS7 provides the extra horsepower networks need, whether large or small. Sigtran interface (IETF SS7 telephony signaling over IP) to the media servers as well as IP Proxy functions are supported via SGF. Consolidating SS7 provides the benefits of reduced point codes and easier maintenance.

The availability of point codes is typically limited. The consolidation of signaling links eases the pressure on these resources or eliminates the need for additional point codes altogether. In this way, the SGF 120 provides immediate network simplification and cost savings. The SGF 120 presents the appearance of a single identity to the SS7 network via the single "virtual" point code of the network and recognizes and processes messages in a transparent manner. The SGF 120 reduces the maximum number of point codes needed in some cases from 50 to only 4.

Various features, advantages and benefits of the SGF 120 include:

allowing multiple multi-function media servers to share signaling links and point codes (PC) providing significant cost savings;

providing concentrated SS7 signaling links;

providing one trunk group across multiple multi-function media sServers; and requiring less SS7 links resulting in reduced monthly connection fees Thus, the present invention includes an integrated telecommunications platform that supports video mail, voicemail and optionally fax messages simultaneously with simplified access to each type of message. The NGMS 260 provides message storage and retrieval for video, voice and fax within a subscriber's mailbox. In one embodiment, the subscriber can access video mail, voicemail and fax messages separately, and in another embodiment, the subscriber can access all messages in an integrated manner.

A single user profile can be defined to support all of the available services. The SMU 265 provides the provisioning interface to access the subscriber records and to enable and disable services. Individual services such as video mail, voicemail and fax can be selected and configurable on a class of service and user profile basis. The present invention includes various aspects and features that can be made available to a subscriber. Such features include:

Call completion of video telephony calls, recording a video and audio message;

Call completion of video telephony calls, recording only the audio portion as a message;

Recording and playing of personalized video greetings;

Recording and playing of personalized video spoken name;

Standard system video greetings;

Standard system video prompts;

Deposit/Retrieval of video messages from 3G-324M compliant wireless devices;

Deposit/Retrieval of video messages from H.323 compliant IP devices;

Retrieval of video messages via a website;

Retrieval of just the audio portion of a video message if retrieving from a device that only supports audio; and Ability to forward a video message to an email address.

The present invention also provides an integrated user interface to access various messages, such as voice, video and/or fax messages. Video prompts are displayed to show the user the options available as they interact with the system. As video prompts are displayed with the appropriate options, the corresponding audio prompt is also played.

As the user sees the menu presented, the options are audibly voiced in parallel. Subscribers interact with the interface through DTMF key presses to select the appropriate options. Because the options are immediately visible, the user does not have to listen to the entire audio menu message before entering their command (via DTMF).

Advantageously, this aspect of the present invention makes the user experience more pleasurable and efficient.

Another aspect of the present invention is providing a high-level of consistency in the call flow for both voice and video mail messages. Advantageously, this aspect of the present invention can enhance the user experience or the ease at which the user can learn and utilize the system embodying the present invention. For instance, in one embodiment, the same set of DTMF selections for accessing video mail and voicemail capabilities can be employed, thereby maintaining consistency for the subscriber. The video and audio portions of system prompts are independent components but are logically linked in the user interface. This method of prompting provides significant flexibility in the user interface. In one embodiment, the present invention can provide flexibility in user experiences based on various elements, such as the type of call, user profiles, class of service, etc. For instance, different user interface menus can be presented based on the user profile and class of service.

In one embodiment, an aspect of the present invention includes a software or user interface tool box allowing a user to create system prompts from standard audio/video files (such as 3GP or AVI) and from static images (such as JPG). The video backgrounds can be easily customized with logos or other messages, which offer a prime opportunity for branding the service. The backgrounds can include motion and other visual effects to hold the user's attention.

In addition, the -audible VXML-based user interface can be customized and branded by the service provider as part of the service implementation process. Both the audio and video interface can be customized into different languages as well.

Another aspect of the present invention is the ability for the deposit or storage of video mail. When a call is received by a telecommunication system employing this aspect of the present invention, the call is processed to start the correct telephony application. Call presentation information is captured and processed to determine whether to address the call as 2G or 3G. In the scenario in which a 3G enabled device is calling another 3G enabled device, upon dialing the subscriber, the caller will be presented with the called party's video greeting and provided the interface (audio and video prompts) to leave a video message. A video message will be stored provided it is longer than the minimum system-defined length required for a valid message.

Moving video messages through the telecommunications platform or system can be accomplished using the message durability and streaming retrieval techniques described in U.S. patent application Ser. No. 11/170,459 filed on Jun. 29, 2005 and incorporated herein by reference.

In one embodiment of the video deposit aspect of the present invention, the video messages are stored in a different format from voice messages. Incoming video messages are recorded on the video media server 220. The recorded messages are saved as raw audio and video data—stored separately. The message durability techniques are then used to move these messages to the application server 250. Advantageously, storing the audio and video portions of the message separately decreases the complexity of the system. For instance, the data rates for audio and video are different, and the difference amount varies, making simple interleaving difficult. If the two data types were to be interleaved, an extended file format such as AVI or 3GP would have to be used. This would increase the processing load on the video media server 220. At playback time, the audio and video data must be fed separately to the video media server 220 software stack, at different and varying rates. If the streams are interleaved, additional processing and buffering are required on the video media server 220 to accommodate playback. In addition, there are circumstances when a only a portion of a message (i.e., the audio portion or the video portion) needs to be retrieved. If the two data types were combined, the NGMS 260 would have to have knowledge of the internal structure of the data (e.g. AVI) to retrieve just the audio or video part. Storing the audio and video separately avoids this issue.

The NGMS 260 operates to manage both audio messages, as well as video messages with or without audio. An account and message database within the NGMS 260 keeps track of the video messages thereby allowing the current applications to work with video messages. Message waiting notification features available for voice messages are also applied for video messages. Thus, those skilled in the art will appreciated that the video, voice and fax messages are stored in the NGMS 260 and are accessible by the subscriber.

Another aspect of the present invention is video mail retrieval and playback. The requirements for video mail retrieval include playing the message to 3G handsets and H.323 terminals, web retrieval, and forwarding the video message as an email attachment.

Figure 3:
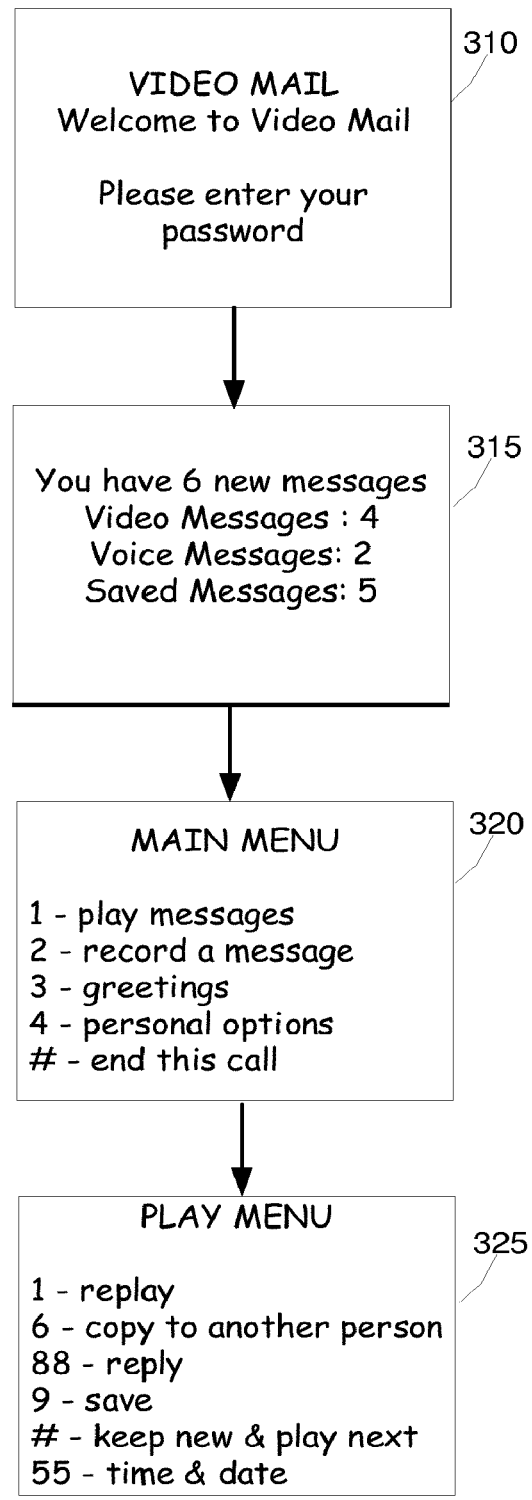
FIG. 3 is a state-flow diagram of various displays utilized in an exemplary embodiment of the present invention.

FIG. 3 is a state-flow diagram of various displays utilized in an exemplary embodiment of the present invention. Initially, the subscriber may be presented with a welcome screen and prompted to enter a password to access his or her video mail 310. When the subscriber successfully logs into the video mail, the subscriber may be presented with a summary screen indicating the messages that have been received for the subscriber 315 (i.e. number of new, types, saved, etc.). This can be a temporary display that automatically changes to the next screen or, the user may be required to take an action to proceed to the next screen. In either case, the next screen presented to the user is the main menu screen 320.

The main menu 320 consists of options the subscriber may select, including playing messages, creating messages, changing their profile options, etc. The actual contents of this menu can be dependent upon the Class of Service, and other options configured by the operator for the particular user or class of users.

If the subscriber selects the "play messages" option, then the system will start playing the first new message, or a saved message if there are currently no new messages in the queue. In an exemplary embodiment, the playback of each message starts with the "envelope" information, which can include the date, time, and originating number (if available) of the message. This is followed by playing the actual message. Once the message is played or while the message is playing, the system presents the subscriber with the options available in the "play menu" 325. This menu includes such options as "delete", "save", "replay", "mark-as-new", etc.

If the message is a fax message, the actual message is not played back to the subscriber, but rather, the play menu would include the option to have the fax sent to the "current call" (if calling from a phone that includes a fax machine), or to send the fax to another telephone number, which can come from the subscribers profile, or be entered by the subscriber on that call.

Playing video messages to subscribers via 3G or H.323 video telephony calls means the message must be retrieved from the NGMS 260 and provided to the appropriate video media server 220. As with voice messages, retrieving the entire message before playback starts would introduce an unacceptable delay to the subscriber. As such, the video messages are retrieved from the NGMS 260 and a media translation engine (MTE) 225 provides transcoding and file formatting for the various applications. In one embodiment, the web application services server 255 will retrieve a standard format video file (e.g. AVI or 3GP) through the OpenUMS protocol. The web application services server 225 then makes the file available to the subscriber via a web inbox. The standard file format is playable by all standard web browsers. The messages may be sent via an email devilry by retrieving the message through OpenUMS, and then MIME encoding the message and sending it out via SMTP.

Video messages are sent to the video media server 220 using a streaming server architecture that effectively avoids any startup playback delay. As is typical in most voice mail systems, the messages can be reviewed multiple times provided they have not exceeded the system-defined age limitation and have not been deleted by the system. During playback of messages and greetings, the audio and video streams must remain synchronized. When a video mail message is recorded, the incoming audio and video streams are synchronized. The two streams must be stored in such a way that they can be played back at the same pace at which they entered the system. This can be a challenge if the message is played on a device that is substantially different than the device from which the message was sent.

During a video mail session, video mail subscribers can access video mail, voicemail and fax messages. When accessing voice messages during a video mail session, there is no accompanying video for the audio message. In one embodiment of the present invention, a default video screen can be provided by the system for display on the playback device. The subscriber can use the standard DTMF key presses to negotiation through the variety of voicemail options.

If a video mail subscriber is unable to negotiate a 3G call into their mailbox, they will still be able to obtain the audio component of their video messages (v-audio). In this case, the system presents the audio interface (DTMF) in which the subscriber may listen to the audio portion of the video message. The aspect of the present invention that allows the audio and video components of the message to be stored separately greatly enhances this aspect of the present invention. At a later time, as long as the video message is not removed from the subscribers mailbox, the subscriber can access the complete video message.

Another aspect of the present invention is to provide a scaled down video mail feature for non-video mail subscribers. For instance, a subscriber may want video mail capabilities but does not have a 3G compatible device for receiving and establishing a telecommunications session that supports video mail. In this aspect of the present invention, the subscribers will be able to obtain the audio component of their video message (v-audio). In addition, the non-video subscribers can be notified via SMS technology that they have received a message, thereby prompting them to access their messages via the web where they can fully appreciate the video capabilities. In addition, non-video mail subscribers can also have messages delivered via e-mail.

Thus, it will be appreciated that these aspects and features of the present invention provide a solution to subscribers that do not have 3G based equipment, yet are able to access some aspects of the video mail service (i.e. audio only, web access to video etc.)

Another aspect of the present invention includes a user-friendly, scalable and cost effective solution that enables subscribers to manage and control their messaging features. In one embodiment, an HTML inbox will allow subscribers to manage their messages as well. This inbox provides access to all of the messages in the subscriber's mailbox (voice, video, and fax), where a subscriber can review, delete, and save messages, as well as forward to another email address.

Using a typical web browser, subscribers can manage their messages, as well as the operation of various messaging features such as greetings, broadcast lists, message forwarding, and more. The web interface can be easily customized to support a service provider's subscriber portal strategy, and can be used to help drive subscribers to the service provider's web site, informing users of new products and services and potentially generating additional revenue. Custom Java Server Pages (JSP) development may be undertaken to provide languages other than English. The web interface is built with HTML (HyperText Markup Language). Web pages are built with HTML tags or codes embedded in the text. HTML defines the page layout, fonts and graphic elements, as well as the hypertext links to additional documents on the Internet. Each link contains the URL or address of a web page residing on the same server or any server on the Worldwide Web. This markup language provides a flexible environment for a service provider to customize web pages with specific branding, logos, banner advertisements, and internationalization. Further more, each service provider determines which features are available for the subscriber to manage, using information such as the Class of Service (COS). The subscriber can only view the features in which he or she has access.

One aspect of the present invention is a mail message platform that supports both voice and video messages. Several of the functions and features of this mail messaging platform are also considered inventive. Several of the functions and features are described in detail below.

The subscribers have certain options to configure their system, account or their interface. These configurations are referred to as personal options and include, but are not limited to, the areas of personal greetings, message notifications and management tools for subscribers.

In one embodiment, a subscriber can record one or more customized video greetings. The user interface provides a greeting menu where the recorded greeting can be reviewed and re-recorded as needed. In the absence of a customized video greeting, the system will present a default video greeting. In embodiments employing multiple video greetings, the actual greeting presented to a calling party can be selected based on a variety of parameters or conditions, including but not limited to, the time of day, the day of the week, the caller ID of the incoming call, the geographic location of the originating call (i.e. different languages can be applied for calls from different countries), etc.

For subscribers that have both audio and video greetings in the system, the audio greetings are played for audio callers and the video greetings are played for video callers. In an exemplary embodiment, subscribers that have both voice and video mail will have a customized video greeting, customized audio greetings, a video signature (video spoken name), and a voice signature (voice spoken name). The system may also have a system default audio greeting and system-default video greeting and the system default greetings can be customizable. In an exemplary embodiment, greetings are presented with the following precedence:
Subscribers video greeting,
Subscriber voice greeting,
Video signature (video spoken name)
Voice signature (spoken name)
Default system-wide video greeting
Default system-wide voice greeting The subscriber may also customize the manner in which he or she is notified when a message is received. In one embodiment, this aspect of the present invention provides the ability to notify the end-user in the manner most convenient to the end-user anytime, anywhere. The end-user has complete control as to the time of day, the day of the week, and which device is notified. In one embodiment of the invention, a notification menu is provided to the subscriber, such as in their voice mail box or accessible through the World Wide Web using a browser, to utilize in the management and settings of the notification options. From a service provider perspective, the present invention may be implemented in a manner that a service provider can allow subscribers to control notification settings or, pre-defined notification settings can be defined for all subscribers, a subset of subscribers, or a particular subscriber.

Various embodiments of the present invention provide various message notification capabilities that are used to furnish subscribers the freedom to use the communication devices that best fit their lifestyle. Message notification services include:

Short Message Service (SMS). Subscribers can receive text messages via a mobile handset for paging, Message Waiting Indications (MWI) that identify the number and type of messages waiting, and caller holding applications.

Message Waiting Indication (MWI). Subscriber can receive notification of a message by lighting the lamp on a landline telephone.

Message Delivery. Messages can be delivered to a wireless or wire line telephone Email Notification Different notification schemes can be configured via class of service and user profile. The scheduling of notifications can be changed based on time of day. It is also possible to customize the content of SMS notifications by manipulating the associated VoiceXML.

Another aspect of the present invention is the provision of management tools for subscribers. The management tools include a web interface that enables subscribers to add, modify, and personalize their preferences and features. Advantageously, this aspect of the present invention increases usage by consumers, improves customer loyalty, and also reduces service provider operating costs through fewer routine service calls. In addition, it provides an easy-to-use web-based interface for subscriber feature configurations, such as:
Password Change/Lost Password
Greetings; Message Playback
Message Forwarding (Figure #1)
Message Waiting Notification
Operator & Fax Numbers; Broadcast Lists Embodiments of the present invention also provide various operations, administration, maintenance and provisioning functionalities and address the needs of service providers facing the challenge of easily managing the messaging system components and applications. This capability is especially critical for carriers experiencing swiftly growing networks, increasing traffic volumes, and a need to implement a fully integrated system management solution.

For instance, one embodiment can allow operations personnel to manage user attendants, perform database management, monitor availability and performance of the overall application components, perform fault management, manage and monitor alarms, and perform reporting.

In addition, the SMU 265 monitors each element in the system and/or the network. Servers are periodically polled for reach-ability, round trip time, and data collection via SNMP "Gets" and Serial String Identification. The SMU 265 may include an alarm management subsystem that stores alarms, tracks active alarms, correlates alarms, presents the alarms, and provides mechanisms for administrators to setup and control the SMU alarm management subsystem. Alarm information can also be made available and viewable to subscribers or operator via the SMU graphical user interface.

Another aspect of the present invention is the storage of statistical information about the messaging network. This information includes traffic and capacity statistics, and usage statistics. This information allows the carrier to completely understand characteristics and performance of their messaging network. Reports from the SMU 265 allow for evaluation of the entire messaging network as well as a single platform's performance. The reporting component also offers a unique charting ability that provides graphical depiction of data.

The Simple Network Management Protocol SNMP is an industry standard protocol for transferring information about hardware devices on a network. The SMU 265 can support SNMP management such as Get, Set, and Trap functions and provides an SNMP monitor and browser to interact with the other elements in the network. The SMU 265 also uses SNMP to communicate with a higher-level system management system.

Management Information Base II, or MIB II, is a database that stores information and statistics about the various devices on a network and enables a network administrator to detect malfunctions or optimize system performance through SNMP. The SMU 265 can provide support for the following MIB II groups: System, Interfaces, AT, IP, ICMP, TCP, UDP, SNMP, and Transmission. The SMU 265 captures information from Glenayre messaging platforms through MIBs. This information is stored in the database of the SMU 265.

The SMU 265 can allow a carrier to capture information from the network without having to maintain links to each and every messaging platform in the network. Information stored in the database includes:
Detail and summary statistics files
Class of Service statistics
Video mail statistics
Provisioning Statistics
Basic SNMP
SNMP statistics for SMS, and MTC
Shared FAX
SMDR/CDR data
Enhanced Traffic Statistics
Interval Statistics
Daily Statistics
Comprehensive Traffic statistics
Database Reporting/Mass Change utilities
Management Information blocks (MIBS)
Keypad usage statistics
Traffic by Signaling Link The present invention may also operate to generate standard call detail records (CDRs) generated by individual messaging platform nodes to provide detail for each of the following information categories:
Messages
Reply
Out Calls
Forward
Deposit
Subscriber Session
Transfers The interface provided by the call processing nodes or elements of the telecommunications platform 200 for the generation and capturing of the CDR is a very flexible interface. Filtering exists to allow for the generation of not only trunk-based statistics but also serial based statistics for applications such as SMPP notification to an SMSC.

In addition to supporting standard SMDR/CDR records, embodiments may support switch-based billing for AMA billing record formats. SMDR information, call counts, elapsed time of call, outdial counts, activity types, and subscriber to be billed, can be routed to a serial port for a CRT, printer, or billing computer. The real-time activity traffic and types can be viewed on a CRT or printer.

In addition, the system can equip service providers with the ability to generate marketing and or operations specific reports tailored to their specific needs. Authentication can be performed through the web-based or telephony interfaces. An attendant can create, delete and update subscribers. Other features that can be included are mailbox suspensions and user reporting.

In an exemplary embodiment of the present invention, a designated administrator may be allowed or enabled to: (a) create, update and delete telephony user interfaces, (b) update web-based user interfaces, and (c) customize the call flow of inbound call handling.

An exemplary SMU 265 may support remote attendant access. This aspect of the invention would enable an administrator using a standard browser (i.e. Netscape or Internet Explorer), to maintain subscriber records, classes of service and other features. In addition, the SMU 265 may provide the administrator with access to other elements of the messaging network. Such access may be based on privilege levels assigned by a system administrator and can be password protected to restrict unauthorized use.

An exemplary SMU 265 may provide a centralized point for service providers to manage all network elements, providing configuration management, fault management, performance management, accounting management, remote access, maintenance, and backup functionality. The SMU 265 provides a single interface for provisioning, alarming, reports, and subscriber migration. The SMU 265 integrates and customizes systems with new elements and applications, and provides operational support and network management functions for carriers experiencing swiftly growing networks and exploding traffic volumes. Core features of the element management component include:
Element Auto-Discovery—When service providers add new network elements, the SMU 265 automatically recognizes them and includes the new elements in the graphical network map
Graphical Network Map—A network/cluster map and map editor provide a snapshot of the entire network or cluster and facilitates quick problem identification and resolution
Time Synchronization—A central time source ensures all network components maintain a uniform time reference across the entire messaging network—important for any distributed architecture
Centralized Network Logging—Logging for the entire messaging network is centralized on the SMU 265

In an exemplary embodiment, the SMU 265 may utilize a dual processor computer and allow remote dial-in for access to the SMU 265 server as well as all other servers in the system via Telnet or other means. Backup of system configurations and other critical data is also accomplished via the SMU 265.

In various embodiments of the present invention, a machine-to-machine interface, a human interface or both interfaces may be present as provisioning interfaces.

The machine-to-machine interface, also referred to as the Computer Interface (CI), includes a Computer Interface Protocol (CIP) that provides complete access to the subscriber database, including queries, insertions, modifications, and deletions. CIP is an ASCII based protocol supported by all major provisioning system suppliers. Remote operations, administrative and maintenance systems can connect to the messaging system via an RS-232 or Ethernet LAN interface and are able to automate provisioning and maintenance tasks. Any command that can be entered on the messaging system's console may be automated using the Computer Interface.

The human interface is a graphical user interface, based on HTML screens, that enables functionality, such as adding, modifying and deleting subscribers.

Using either interface, the SMU 265 provides the provisioning functionality by accepting provisioning commands from either administrators using the web-based provisioning application provided by the SMU 265, and/or the Computer Interface Protocol (CIP) commands from external systems.

Provisioning on the messaging platform can be accomplished through the standard screens of the subscriber records menu—a text-based menu available from the main system menu. Records can be addressed from the subscriber record menu with the following actions:

List
Display
Create
Modify
Delete

In a particular embodiment, the SMU 265 can be a software product that runs on off-the-shelf hardware and consists of a set of integrated software modules and graphical user interface (GUI) tools to simplify and speed the deployment, maintenance and administration of the messaging platform enhanced services product family. The SMU 265 platform provides a single point of provisioning and maintenance for subscriber records.

Figure 4:
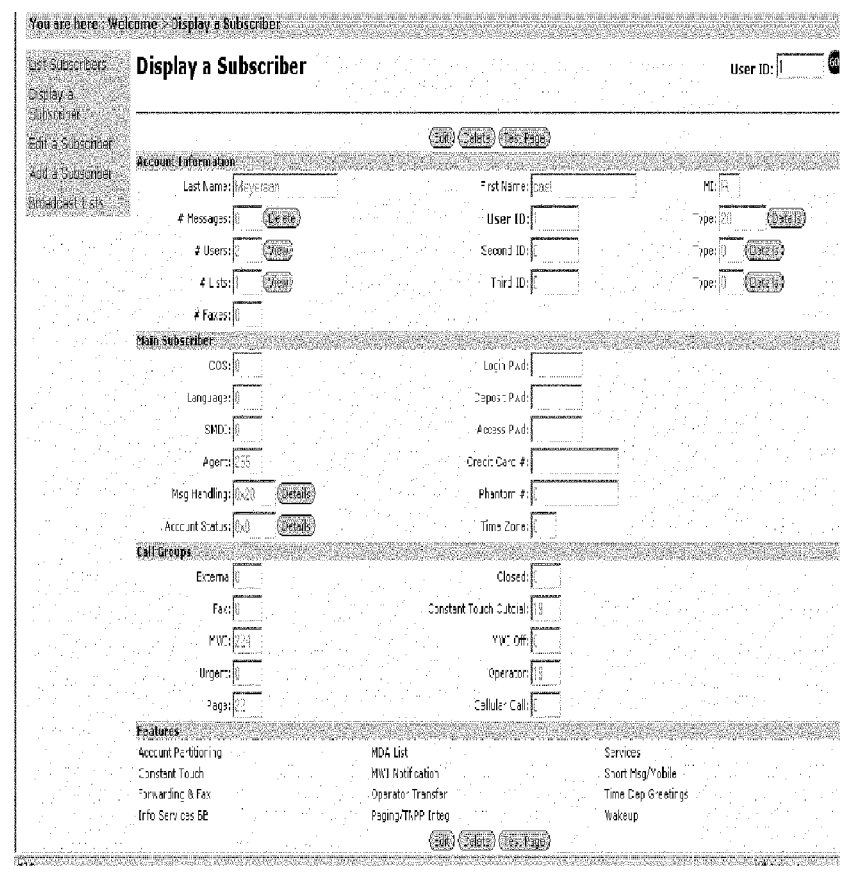

The web provisioning functionality for the SMU 265 will allow subscriber records to be modified via the Web. One of the key benefits is extending subscriber record access to more call centers without tying up additional telnet sessions. FIG. 4 is a screen shot of an exemplary subscriber provisioning screen that can be incorporated into an embodiment of the present invention.

Advantageously, web provisioning allows an administrator to look up a subscriber record without having to first know on what platform the record resides. Two specific scenarios where this is important include:

service providers who have multiple platforms in one location; and service providers whose customer call centers handle more than one service area supporting multiple platforms The SMU 265 provides (a) subscriber provisioning, (b) network management, (c) centralized messaging system platform configuration management, (d) reporting and statistics, and (e) alarming with SNMP/MIBs.

The reporting and statistics operation of the SMU 265 monitors system traffic and other usage and performance data. This information can be used to provide near real-time or summary reports for daily operational needs. Service providers are given the flexibility to design their own unique, custom reports. As a particular implementation example, the SMU 265 may employ a reporting software application, such as Crystal Reports 9.0 Professional, which allows the service provider to make ad hoc queries and generate various styles of reports on a remote, desktop PC. the reporting and statistics application queries the SMU 265 database and presents the information in a logical, easy to understand format.

These reports pull data from SMDRs (Station Message Detail Records), while summary reports present information from Performance Statistics Records. Both types of data are generated from managed elements and collected through the SMU's 265 database batch process or the SMU 265 Network Management/SNMP agent. Information is stored on the SMU 265 server.

The SMU 265 may also support provisioning of subscribers through a computer interface reachable from a carrier's provisioning system. In this setup, the operator is in complete control of provisioning with the common computer interface. Provisioning systems can send standard computer interface commands and let the SMU 265 decide where to put the record, or they can request the specific platform when sending the common computer interface command.

In addition, the SMU 265 supports web-provisioning. Service providers can provision subscribers as well as maintain subscriber accounts using a web-provisioning interface. This interface allows any attendant with appropriate permissions to access a subscriber's account using a web browser and network connection, eliminating the need to open telnet sessions for general account maintenance. The screens are structured to be familiar to the telnet attendant screens, thus eliminating any learning curve associated with a new attendant interface.

Video Telephony Standards and Architecture

Figure 5:
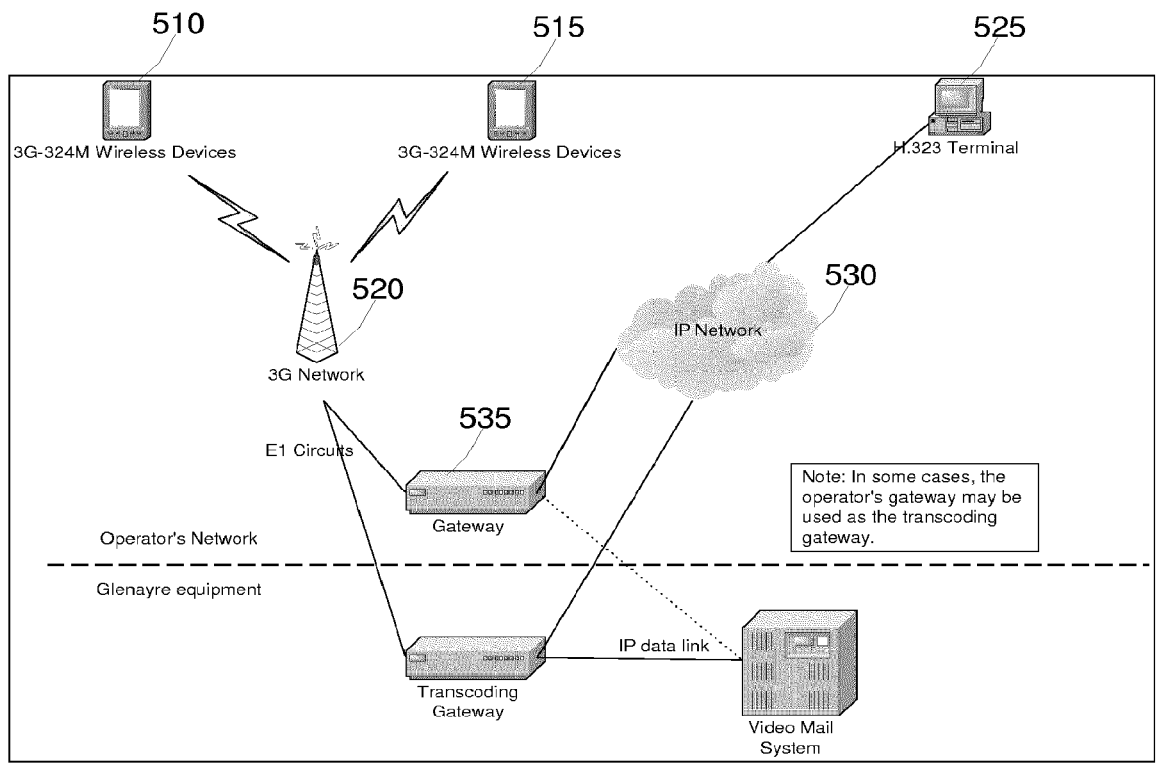
FIG. 5 is a block diagram illustrating a typical video telephony network.

Those skilled in the art will appreciate that different standards are used for IP and 3G wireless video telephony. Currently video telephony is not supported at all in 2G and 2.5G networks. FIG. 5 is a block diagram illustrating a typical video telephony network. Calls from a first wireless device 510 to a second wireless device 515 are able to stay within the confines of the 3G network 520 and are based on the 3G-324M protocol. However, to enable a call between an H.323 terminal 525 on an IP network 530 and a 3G wireless device 510, a gateway 535 must be provided to enable the calls.

Figure 6:
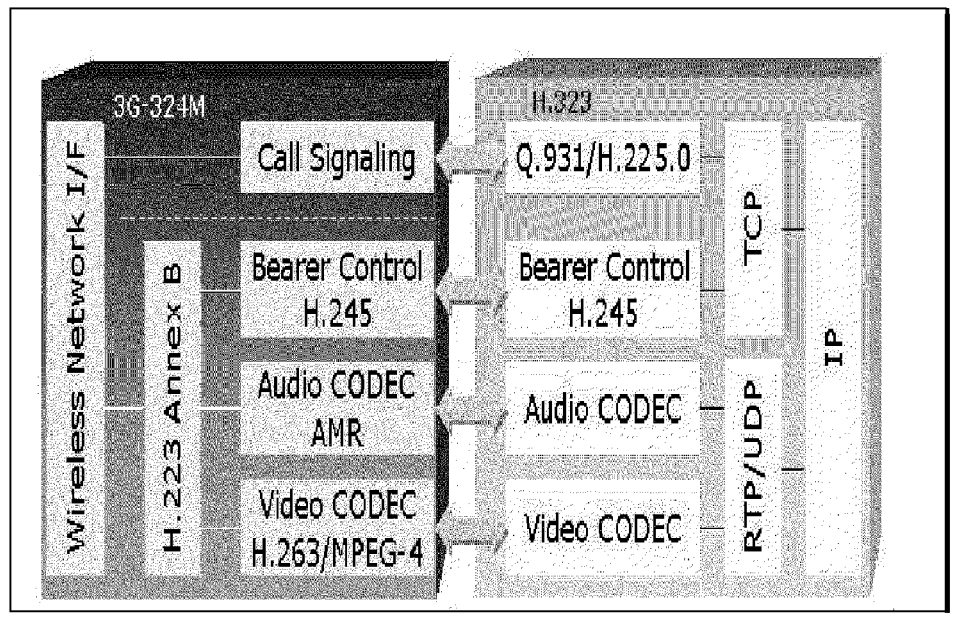
FIG. 6 is a protocol stack diagram that illustrates the underlying structure of the 3G-324M and H.323 protocols and the translation functions that must be performed by the gateway.

The gateway 535 performs translations between the different control protocols used in the 3G and IP networks. It also performs media translation if necessary, converting the audio and video formats between 3G and IP. FIG. 6 is a protocol stack diagram that illustrates the underlying structure of the 3G-324M and H.323 protocols and the translation functions that must be performed by the gateway.

The 3G-324M protocol is designed to operate over circuit-switched connections. For the near future, only wireless circuit connections provide the bandwidth and quality of service needed to support video telephony.

An additional advantage to using the existing circuit-switched network is that call addressing and setup is done using existing mechanisms. In FIG. 6, the 3G-324M "Call Signaling" function uses standard telephone numbers and calling procedures to make the initial connection between devices.

Once the devices are connected, the H.245 protocol takes over and performs negotiation of capabilities between the two devices. These capabilities include media types, codec choices, and multiplex information. The H.245 connection remains active throughout the call, and capabilities can be renegotiated at any time.

After the connected devices have negotiated a compatible set of capabilities, the audio and video codec streams are activated. The H.223 protocol manages the multiplexing of audio, video, and control information on the circuit-switched connection.

Error control is built-in to the video connections. The error control mechanism does not rely on retransmissions, but instead relies on "fast update" requests. The video codecs generally only transmit differences between video frames. If the receiver detects an error, it makes a "fast update" request for the next frame to be transmitted in full. This has implications for retrieving a video mail message, since at any time during the video stream the transmitter may need to regenerate an entire frame of video, rather than just a small difference packet.

The H.323 protocol operates similarly to 3G-324M, except that it uses IP connections for connectivity between devices. Since the concept of a "call" is not built in to IP, H.323 devices use a call signaling protocol based on Q.931. Once a call is established between two devices, the H.245 protocol takes over for capability negotiations, and then the audio and video codec connections are established using RTP.

As an implementation example, the codecs used with H.323 should be either G.711 (high bandwidth connections) or G.723.1 (low bandwidth). The video codec is most often H.263.

Figure 7:
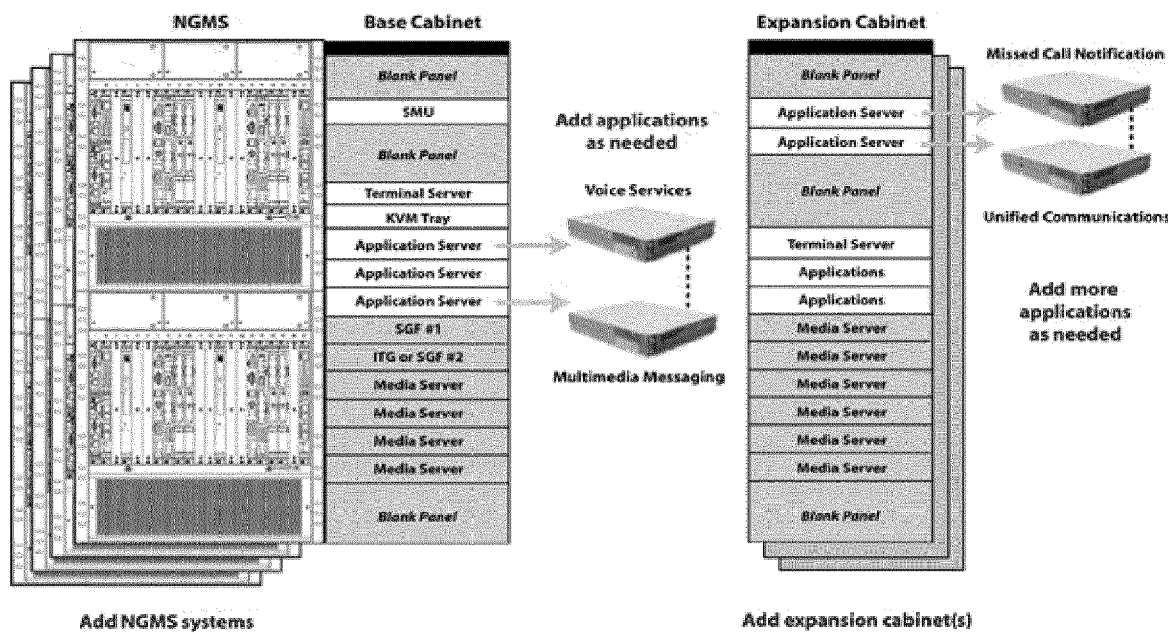
FIG. 7 is a system diagram showing a scalable embodiment of the present invention.

In one embodiment of the present invention, the system is constructed in a manner to be broadly scalable. FIG. 7 is a system diagram showing a scalable embodiment of the present invention. Depending on the capacity requirements and commercial applications deployed, the system can be configured in a dual cabinet or in multiple cabinets. A required cabinet is referred to as a base cabinet 710 and additional cabinets are referred to as expansion cabinets 720. In this embodiment, the base cabinet 710 contains all hardware needed to deploy the system with up to 32 T1/E1 spans. An expansion cabinet 720 in this embodiment contains all hardware needed to deploy the system up to a maximum of 6 media servers per expansion cabinet. In addition, the subscribers that can be supported by the system can be increased by adding additional CDMS systems.

Another aspect of the present invention is guaranteed message delivery accomplished through message durability. Message durability refers to the requirement that once a subscriber records a message in a VoiceXML session, the message is "durable" in that the message will be deposited in the NGMZ regardless of applications server 250 and/or multi-function media server failures. As a result, the message system provides a robust, efficient and scalable repository for guaranteed voice message delivery from multi-function media server to the message store. In providing this aspect of the present invention, the system includes four main functions:

obtain a request from a VXML browser by socket connection, and save the data into a persistent store send the message to the receiving servlet and delete it from the multi-function media server if and only if the message is successfully saved into the message server receive the message and invoke the open API to save the message into message server gets the message from message server and uploads it to the NGMS in one transaction.

The message is deleted from the message Server only after the uploading is successful Provisioning interfaces in embodiments of the present invention are customizable to meet operators' specific needs. Using Java Server Pages, a combination of HTML and embedded Java code, dynamic web pages can be created. New JSPs invoke system commands and return results to the client through the browser. This process can be used for integration tasks (third-party software), executing scripts, and connecting to databases. In addition, new class-of-service (COS) packages can be created. Additionally, Computer Interface Protocol (CIP) can be used to integrate the system into existing operator OSS/TNM systems. CIP is a machine-to-machine protocol that allows the system to communicate directly with the operator's existing provisioning system.

A key benefit of the present invention's architectural approach to applications creation is the ability to configure subsystems from a single point (SMU) and propagate as needed to all other system components throughout the network in either local or distributed (WAN) architectures.

The present invention employs the use of open industry standards such as VoiceXML, J2EE, JSP, JSDL and ECMA-Script to enable simpler development of new telephony applications and support messaging functionality, interactive voice response (IVR) integration, and wireless connectivity. This allows service provider personnel to change call flow menus, prompts, DTMF key mapping and more.

To maintain interoperability and compliance with the VoiceXML specification, the VoiceXML technical strategy employed in embodiments of the present invention is to discourage definition of proprietary VoiceXML tags. However, because the VoiceXML specification does not provide all the functionality potentially desired or required applications, there is a need for platform-specific functions via <OBJECT> tags. New tags will be adopted as they become available.

Embodiments of the present invention can be constructed so that they can be easily adapted to accommodate other languages and geographic requirements. Subscribers set language preferences during the initial tutorial as allowed by the COS determined by the operator. The system supports localization and internationalization as follows:

Voice prompt localization

Subscriber selection of prompts in languages offered by the operator

North American or international phone numbers are supported

Embodiments of the present invention can support I18N and L10N design to support multiple localizations worldwide and on demand. Such embodiments comply with the International Standards Organization (ISO) for locale designations that define the language and territory according to a five alpha character designation. Both North American and international dial plans are supported.

It should be appreciated by those skilled in the art that embodiments of the present invention can be based on the Advanced Telecom Computing Standard (ATCA) architecture for products. ATCA offers the ability to improve overall system performance while at the same time reducing the system footprint and space requirements. Thus, greater densities in less space with improved reliability will be provided with ATCA.

It will be appreciated that embodiments of the present invention may include:

a single mailbox for all supported message types ability to retrieve and leave video mail messages from/to other video mail subscribers ability to access messages and greetings to/from the mailbox via the web ability to access messages via email retrieving the audio messages left by a non-video mail subscriber on the same call to the mailbox that video messages were retrieved retrieving the audio portion of a video message Table 1 itemizes some of the actions taken in the video mail server of the present invention in response to certain network actions or events based on the characteristics of the calling and the called entity.

Figure 8A:
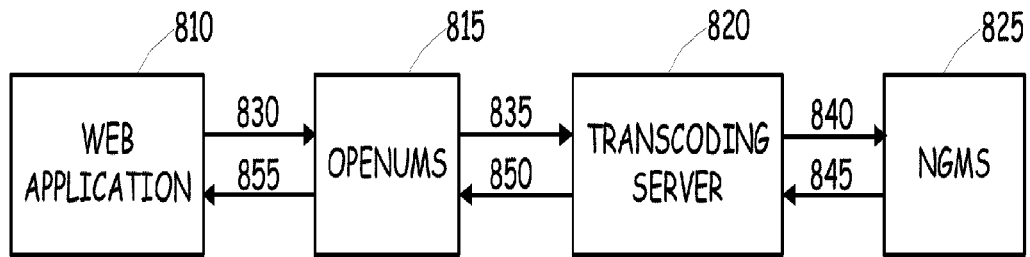
FIG. 8A is a sequence flow block diagram illustrating four main architectural components and actions involved in providing web access to video mail.

Another aspect of the present invention is to provide web access to video mail. Utilizing this aspect of the present invention, a subscriber can use a web browser to playback and record video messages as well as change video greetings. To support video mail requirements through the media server and the web browser, the audio needs to be transcoded. FIG. 8A is a sequence flow block diagram illustrating four main architectural components and actions involved in providing web access to video mail. The four main components include a web application 810, an OpenUMS 815, a transcoding server or media translation engine 820 and the NGMS 825. In operation, a video message is played back as described in the following steps.

Initially, the web application 810, most typically in response to a subscriber action (e.g. viewing the message summary listing and selecting a particular video message to for playback), sends a request for the playback of a video message 830 to the OpenUMS 815. An exemplary request would include a subscriber identification, a message identification and a target file format, such as mpeg, avi, 3gp, etc. The OpenUMS 815 submits the request 835 to the transcoding server 820. The transcoding server 820, in response to the received request, further requests the NGMS 825 to provide the necessary and applicable audio and video blocks 840. As the transcoding server 820 receives the audio and video blocks 845 from the NGMS 825, it creates a file. Thus, the transcoding server 820 operates to retrieve audio and video blocks from the NGMS 825, as well as obtaining the metadata required for conversion (i.e., picture size, frame rate, etc.). The transcoding server 820 then creates an audio file and a video file from the blocks and, using FFmpeg, transcodes the file into a format suitable for the target playback device and strips out any RTP headers. FFmpeg is a set of open source computer programs that can record, convert and stream digital audio and video. The transcoding server 820 then provides the converted file 850 to the OpenUMS 815. Finally, the OpenUMS 815 provides the file 855 to the Web Application 810 for being rendered to the target device.

Figure 8B:
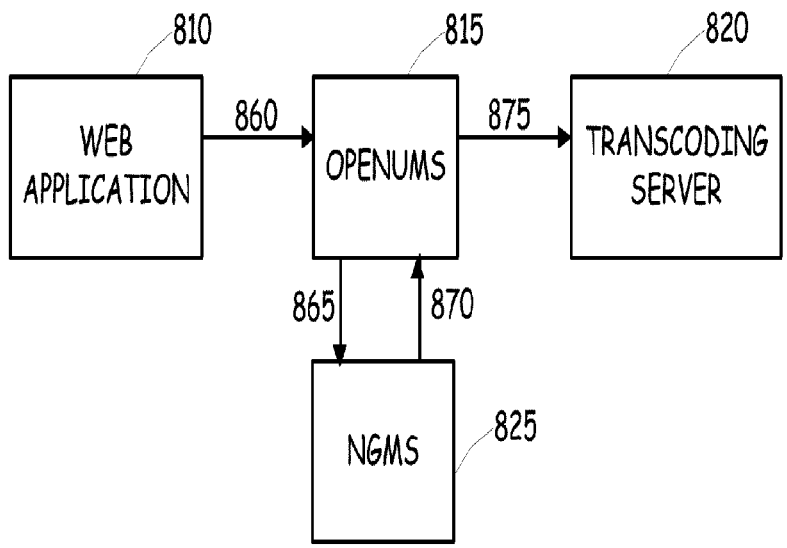
FIG. 8B is a sequence flow block diagram illustrating four main architectural components and actions involved in providing web access to video mail for changing a subscriber's video greeting.

FIG. 8B is a sequence flow block diagram illustrating four main architectural components and actions involved in providing web access to video mail for changing a subscriber's video greeting. Initially, the web application 810 submits a file 860 to the OpenUMS 815. The file basically includes a new greeting that has been created or obtained by the subscriber. The subscriber also indicates through the web application 810 that he or she wants to change the video greeting. The OpenUMS 815 then submits the new file 865 and a list of translation targets as a request to the transcoding server 820. The transcoding server 820 translates the new file into the various formatting requirements for the identified targets and returns the translated files 870 to the OpenUMS 820. Finally, the OpenUMS 820 writes the translated greeting files 875 to the NGMS 825 based on one of several case scenarios.

In a first case scenario in which the new video greeting is being set, the OpenUMS 815 receives a video container file (e.g., AVI) and writes to the NGMS 825 an audio file based on G.711 including RTP headers and a video file based on H.263 including RTP headers. In a second case scenario in which the audio in a video greeting is being used to set a new audio greeting, the OpenUMS 815 receives a video container file (e.g., AVI) and writes to the NGMS 825 an audio file based on GLADPCM. In a third case scenario, in which the new video greeting is being set but in addition, the audio portion is being used as an audio greeting, the OpenUMS 815 receives a video container file (e.g., AVI) and writes out to the NGSM 825 an audio file based on G.711 including RTP headers, a video file based on H.263 including RTP headers and an audio file based on GLADPCM. In a fourth scenario in which the video portion of an audio greeting and an audio portion of a video greeting are being set, the OpenUMS 815 receives an audio file (e.g., WAV) and writes out to the NGSM 825 an audio file based on G.711 including RTP headers and an audio file based on GLADPCM. In a fifth case scenario in which the video in a video greeting is set to be the video portion of a greeting, the OpenUMS 815 receives a video container file (e.g., AVI) and writes out to the NGSM 825 a video file based on H.263 including RTP headers.

Figure 8C:
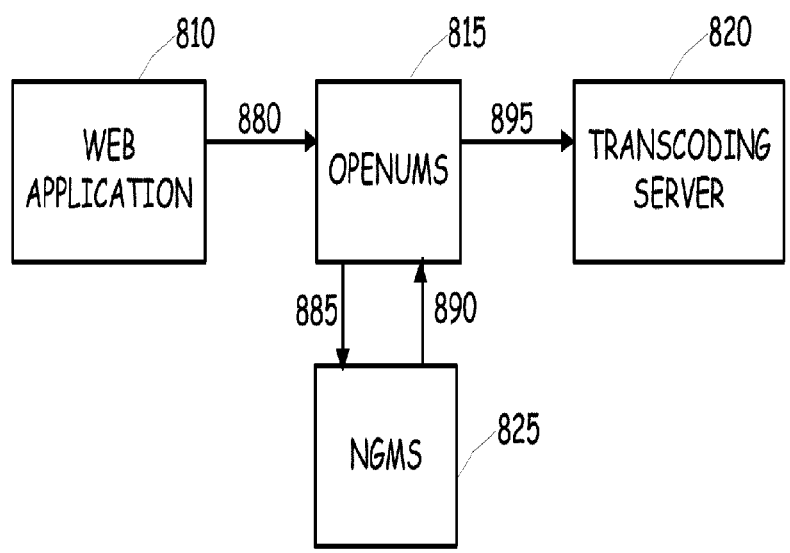
FIG. 8C is a sequence flow block diagram illustrating four main architectural components and actions involved in providing web access to video mail for depositing a video message.

FIG. 8C is a sequence flow block diagram illustrating four main architectural components and actions involved in providing web access to video mail for depositing a video message. Initially, the web application 810 submits a file 880 to the OpenUMS 815. The subscriber also indicates that he or she wishes to create and send a video message. The OpenUMS 815 then submits the new file 885 and a list of translation targets as a request to the transcoding server 820. The transcoding server 820 translates the new file into the various formatting requirements for the identified targets and returns the translated files 870 to the OpenUMS 820. Finally, the OpenUMS 820 writes the translated greeting files 875 to the NGMS 825. The input for the file is a video container file (e.g., AVI and the output is an audio file based on G.711 including RTP headers and a video file based on H.263 including RTP headers.

In an exemplary embodiment, the transcoding server 820 (or the media translation engine) provides defined interfaces to support block-based and file-based transcoding functionality. In a particular embodiment, the transcoding server is deployed along with a streaming server within the platform. However, in other embodiments the transcoding server may be deployed on a separate host or platform from the streaming server functionality. Deploying the transcoding server with the streaming server advantageously does not impact the scalability or performance as would be the case if they are deployed on the NGMS, is easier to scale and is more flexible than other options. However, additional overhead is incurred with the retrieving of extraneous blocks to create a stream because the conversion cannot be performed on a block by block basis.

Alternatively, the transcoding server can simply be provided by a third party. Advantageously this allows for a quicker time to market, supports broader transcoding requirements and is updated to keep pace with current standards. However, such an embodiment is also hit with licensing costs, performance overhead and integration costs.

Another alternative is to deploy the transcoding server on the NGMS. Advantageously, this eliminates the requirement for additional movement of blocks from the NGMS to a separate host. Those skilled in the art will appreciate that conversion cannot be performed on a block by block basis and thus, often times requires the transfer of additional blocks is necessary. For instance, additional source blocks may be required to create a single target block, block sizes may not align and intermediate buffering for audio and video streams and file conversion is required. In addition, this embodiment can save an entire video message in the correct format. For example, if a message has been converted and needs to be played back again, no subsequent conversion is required. However, disadvantages of this embodiment include negatively impacting the performance and scalability of the NGMS and would limit deployment options.

Another advantage of the communications platform is the ability to include and incorporate a variety of applications. Whether the application is native on the platform or sourced from a third party vendor, the applications allow the communications platform to be customized for various customer needs and product differentiation. Some of the applications that can be easily incorporated into the communications platform include the following.

Voice Mail—Provides subscribers with a variety of features designed around the exchange of voice messages content.

Missed Call Notification—An extension of Caller ID and heavily demanded by wireless operators. Missed Call Notification picks up where Caller ID leaves off. Unlike Caller ID service, which only provides an incoming call number if the wireless phone is on and in the network coverage area, Missed Call Notification provides a continuous, network-based service providing subscribers with the added peace of mind that they will never miss an important call. Now when a subscriber is unable to receive calls, their Missed Call Notification service will capture and store the incoming call information until they become available. At that time, an SMS message containing a list of all missed calls is sent to the subscriber, allowing them to return calls at their convenience.

Multimedia Messaging—MMS allows subscribers to personalize their communications with up-to-the-minute multimedia content such as photos and music to create messaging that breaks the boundaries of traditional communication. With features like Message Composer, Photo Album and Greeting Cards, subscribers can send and receive dynamic multimedia content on their MMS-capable mobile phones, PDAs and PCs. Subscribers can also send multimedia content to non-MMS subscribers via the Internet, driving traffic to an operator's website thereby increasing subscriber usage.

Unified Communications—A complete package of services customized to your subscribers' needs, including voice, fax and e-mail messaging, a single mailbox for all message types, an integrated address book, and special on-line management and personalization tools.

Multi-Party Personal Conference Service—Gives subscribers the ability to initiate instant conferences with friends/family.

Voice-Enabled Messaging Services—Powerful voice-controlled telephony services. Subscribers have access to an array of services through their own personal contact number and an easy-to-use voice interface that features natural language recognition and optional text-to-speech capability. Features common to a Voice Enabled Messaging Suite include navigation of voice mail via spoken commands, voice dialing and a voice controlled address book, delivered on an IP-based architecture compliant with industry standards such as VoiceXML and SALT.

Voice MMS—Enables subscribers to have greater access and control over their communication channels by allowing newly deposited voice mail messages to be delivered to an MMS-capable handset or e-mail box in the form of an audio clip. Subscribers can also share voice messages via e-mail and to forward voice messages to destinations outside of their voice mail system.

Figure 9:
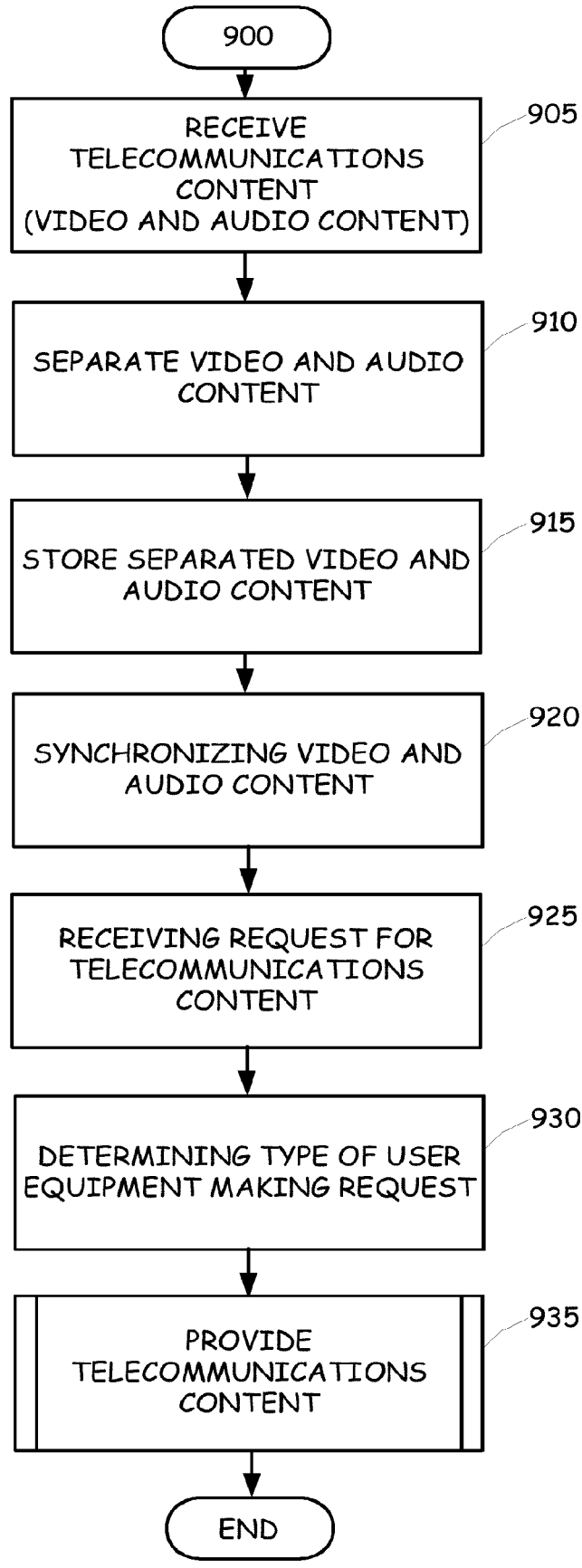
FIG. 9 is a flow diagram illustrating the operation of the present invention in providing messaging services that may include video content to user equipment.

FIG. 9 is a flow diagram illustrating the operation of the present invention in providing messaging services that may include video content to user equipment. Various types of user equipment may access a telecommunications platform that provides video content services; however, not all of the accessing user equipment may be capable of receiving and/or rendering video. In addition, based on user selectable options or class-of-service defined options, the capabilities of the accessing equipment may also be restricted.

The process 900 includes the reception of telecommunications content to be provided to end user devices 905. The telecommunications content can include both audio and video components. The telecommunications content can be received in a variety of formats and the process converts the format to a desired format, if necessary and then separates the audio components and the video components 910 and stores the audio components and the video components as separate content 915. A technique such as RTP stamps is utilized to maintain synchronization between the audio content and the video content 920. When a subscriber desires to obtain the telecommunications content, actions are taken to cause the user equipment to request the telecommunications content 925. As a non-limiting example, such actions may include a subscriber dialing a number to retrieve his or her video mail and then requesting telecommunications content associated with a video mail message.

In response to receiving the request, the type or compatibilities of the user equipment are determined 930. The user equipment may be a digital wireless device such as a 3G compatible phone, or it may have not video capabilities. In addition, various options can be set for the user equipment that may determine the video capabilities of the user equipment. The class of service that the subscriber operating the user equipment may also be used to limit and/or define the video capabilities of the user equipment. Each of these items, as well as other items may be checked to determine what video or other content capabilities are supported by the user equipment at the time of receiving the request. Once the type and capabilities of the user equipment is determined, the process continues by providing the telecommunications content, modified, restricted or limited as necessary in accordance with the capabilities of the user equipment.

Figure 10:
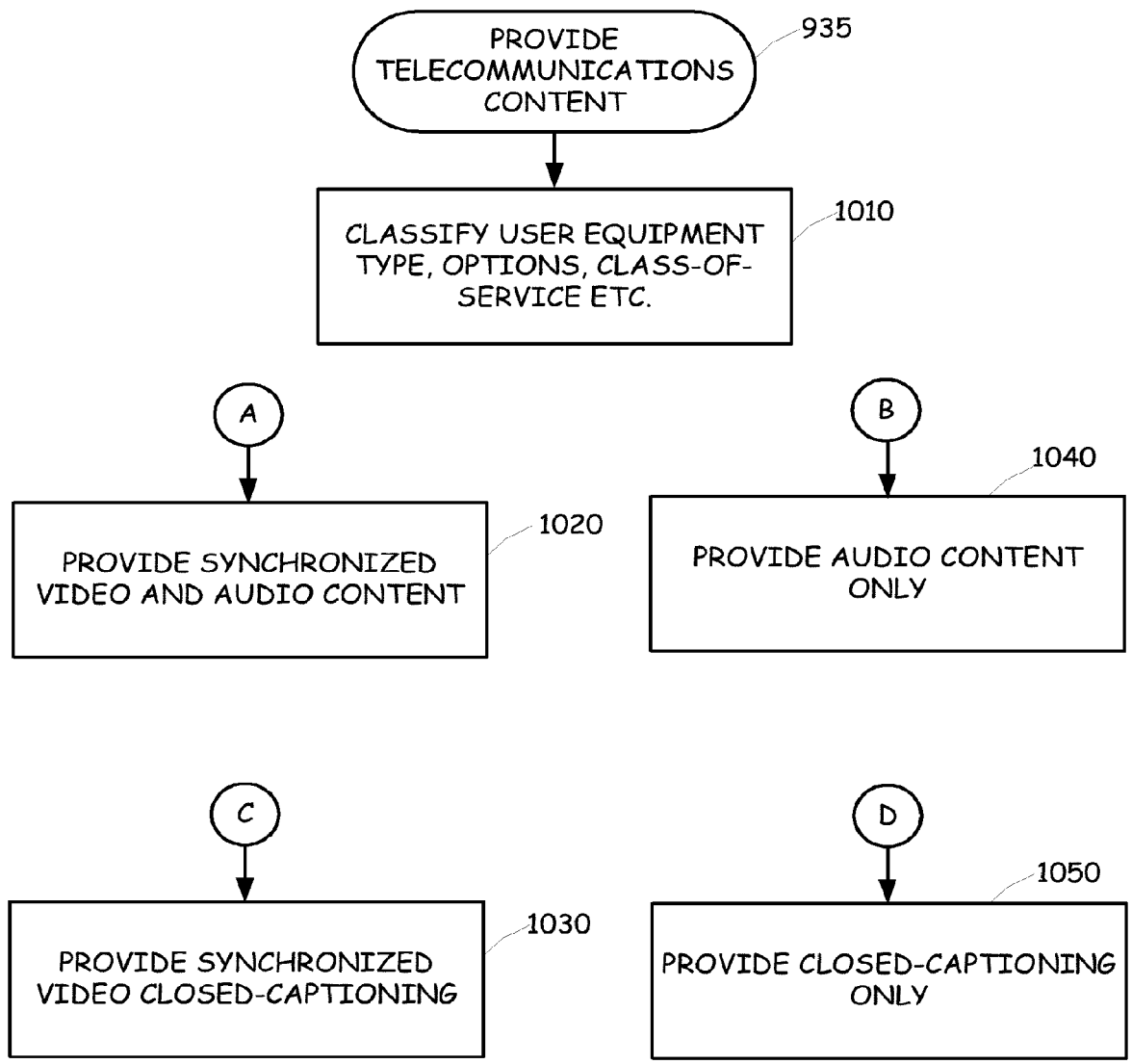
FIG. 10 is a flow diagram illustrating one embodiment of providing the telecommunications content to the user equipment.

FIG. 10 is a flow diagram illustrating one embodiment of providing the telecommunications content to the user equipment. The process of providing the telecommunications content 935, as previously described, can be based on several factors. In the illustrated embodiment, the specific factors are not enunciated but rather, a generic operation based on the culmination of factors is presented. The factors in determining the format and content to be provided to the user equipment may be based on the type of user equipment, user selectable options, service provider selectable options, class-of-service, network based parameters such as restrictions imposed due to bandwidth constraints, outages or the like, as well as other factors. The factors are classified to determine the type and format of content to provide to the user equipment 1010. Based on the classification, one of several options are taken for provision of the content. Under one classification A, synchronized video and audio content are provided to the user equipment 1020. Under another classification B, only audio content is provided. It should be appreciated that such a classification may be selected based on the user equipment not being capable of receiving video content, but may also be elected by a user that may prefer a faster download and review of the content and as such, selects audio only. Other factors may also be utilized in making this classification. Under yet another classification C, synchronized video and closed-captioning are provided to the user equipment 1040. Finally, under another classification D, only closed captioning is provided to the user equipment 1050.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

TABLE 1

| Calling | Called | Network action | Action taken in VideoMail (VM) system |
|---------|--------|----------------|----------------------------------------|
| | | Deposit | |
| 3G | 3G | Network notes calling and caller are both 3G. | Call is forwarded to VM and routed to VideoMS by the network switch, |

TABLE 1-continued

| Calling | Called | Network action | Action taken in VideoMail (VM) system |
|---|---|---|---|
| | | | where it is treated as a 3G call. Calling party receives the called-party's video greeting, and provided video and audio prompts to leave a message. A video message (video and audio) can be deposited. Messages deposited into called party's box as a video message |
| 2G | 2G | Network notes calling and called is both 2G | Call is routed to VM, and routed by the network switch to standard MS, where it is treated as a normal 2G voice call, and deposited into the called party's box as a voice message |
| 2G | 3G | Network notes that caller is 2G, and routes the call to called party as a 2G call | Call is routed to VM, and routed by the network switch to standard MS, where it is treated as a normal voice call. Calling party receives the called-party's voice greeting, and with only audio prompts to leave a message. The message is deposited in the called party's mailbox as a voice message |
| 3G | 2G | Network notes that the caller is 3G, but the called party is 2G. As those two types of phones cannot communicate in those modes together, one of two things will happen: 1) Network will block the call, and require the calling party replace the call as a 2G call. (the two-button phone), or 2) Network will, in a proprietary fashion, get the calling 3G phone to automatically go into 2G mode, and the call proceeds as a 2G call. | Call is routed to VM, and routed by the network switch to standard MS, where it is treated as a normal 2G voice call. Calling party receives the called-party's voice greeting, and with only audio prompts to leave a message. The message is deposited in the called party's mailbox as a voice message |

Retrieval

| Calling | Called | Network action | Action taken in VideoMail (VM) system |
|---|---|---|---|
| 3G | VM | Network notes the caller is 3G, and routes the call to the VideoMS. | Caller is presented with a "enter password" video and audio prompts. Caller is presented with video and audio "main menu" Caller is presented with a generic summary screen, and the audio portion lists all messages. "You have 7 messages, 3 are video. Two are new" When a message is played, the streaming clients on the VideoMS connect to streaming servers on a Media Translation Engine. The MTE converts audio messages to the proper encoding for 3G playback. (Note that if the system is implemented without a Media Translation Engine, the subscriber must make separate calls to retrieve messages. A 3G video call to retrieve video messages. A 2G call to retrieve audio messages.) (MTE as well as obtaining the audio portion of a video message is a November deliverable) |
| 3G, but placing a 2G call | VM | Network notes caller is 2G, and routes the call to the standard MS. | Caller is presented with a "enter password" audio prompt. Caller is presented with standard audio "main menu" Caller is presented with a standard message summary prompt listing all messages. "You have 7 messages, 3 are video. Two are new" When a message is played, the streaming clients on the MS connect to streaming servers on a Media Translation Engine. The MTE converts the audio portion of video |

TABLE 1-continued

| Calling | Called | Network action | Action taken in VideoMail (VM) system |
|---|---|---|---|
| | | | messages to the proper encoding for 2G playback. (Note that if the system is implemented without a Media Translation Engine, the subscriber must make separate calls to retrieve messages. A 3G video call to retrieve video messages. A 2G call to retrieve audio messages.) (MTE as well as obtaining the audio portion of a video message is a November deliverable) |
| 2G | VM | Network notes caller is 2G, and routes the call to the standard MS. | Same as 3G phone making a 2G call. |

What is claimed is:

1. A method for providing messaging services to a plurality of types of user equipment, wherein some of the plurality of user equipment support video messaging and some of the plurality of user equipment do not support video messaging, the method comprising the steps of:
   receiving telecommunications content that includes video content and audio content;
   separating the video content from the audio content;
   storing the separated video content and the audio content;
   synchronizing the video content and the audio content;
   receiving a request for the telecommunications content;
   determining the type of user equipment initiating the request;
   providing the telecommunications content to the requesting user equipment based at least in part on the determination of the type of user equipment.

2. The method of claim 1, wherein the step of determining the type of user equipment comprises determining that the requesting user equipment is a 3G compatible device and, the step of providing the telecommunications content further comprises providing synchronized video content and audio content.

3. The method of claim 1, wherein the step of determining the type of user equipment comprises determining that the requesting user equipment does not support video and, the step of providing the telecommunications content further comprises providing only the audio content of the telecommunications content to the requesting user equipment.

4. The method of claim 1, wherein the step of providing the telecommunications content further comprises providing the content based on the class of service associated with a subscriber utilizing the requesting user equipment.

5. The method of claim 4, wherein the step of determining the type of user equipment comprises determining that the requesting user equipment is a 3G compatible device and, the step of providing the telecommunications content further comprises providing synchronized video content and audio content to the requesting user equipment if the subscriber has subscribed to a class of service that includes video and audio content support.

6. The method of claim 1, wherein the step of providing the telecommunications content further comprises providing the content based on subscriber selected options.

7. The method of claim 6, wherein the step of determining the type of user equipment comprises determining that the requesting user equipment is a 3G compatible device and, the step of providing the telecommunications content further comprises providing synchronized video content and audio content to the requesting user equipment if the subscriber has selected options that permit the delivery of video and audio content.

8. The method of claim 6, wherein the step of determining the type of user equipment comprises determining that the requesting user equipment is a 3G compatible device and, the step of providing the telecommunications content further comprises providing synchronized video content and audio content converted into closed captioning text to the requesting user equipment if the subscriber has selected options that permit the delivery of video and closed captioning.

9. The method of claim 6, wherein the step of determining the type of user equipment comprises determining that the requesting user equipment is a 3G compatible device and, the step of providing the telecommunications content further comprises providing audio content to the requesting user equipment if the subscriber has selected options that only permit the delivery of audio content.

10. The method of claim 6, wherein the step of determining the type of user equipment comprises determining that the requesting user equipment is a 3G compatible device and, the step of providing the telecommunications content further comprises providing closed captioning content to the requesting user equipment if the subscriber has selected options that only permit the delivery of closed captioning content.

11. A telecommunications platform for providing telecommunication messaging services to a plurality of user equipment of varying types, the telecommunications platform comprising:
   a digital wireless network interface over which video communication services can be provided to at least one of the plurality of user equipment;
   a memory storage device containing telecommunications content comprised of video content components and audio content components;
   a video media server communicatively coupled to the digital wireless network interface and the memory storage device and being operable to:
   receive the telecommunications content from a content source;
   separate the video content from the audio content;
   store the separated video content and audio content on said memory storage device;
   synchronize the video content and the audio content;
   receive a communication from user equipment through the digital wireless network interface, the communication being a request for the telecommunications content;

determine the type of user equipment initiating the communication;

provide the telecommunications content to the requesting user equipment based at least in part on the determination of the type of user equipment.

12. The telecommunications system of claim 11, wherein the type of user equipment initiating the communication is a 3G compatible device and, the video media server is operable to provide the telecommunications content by providing synchronized video content and audio content to the user equipment through the digital wireless network interface.

13. The telecommunications system of claim 11, wherein the type of user equipment does not support video and, the video media server is operable to provide the telecommunications content by providing only the audio content of the telecommunications content to the requesting user equipment.

14. The telecommunications system of claim 11, wherein the video media server is further operable to provide the telecommunications content by providing the content based on the class of service associated with a subscriber utilizing the user equipment.

15. The telecommunications system of claim 14, wherein the user equipment is a 3G compatible device and the video server is further operable to provide the telecommunications content by providing synchronized video content and audio content to the requesting user equipment if the subscriber has subscribed to a class of service that includes video and audio content support.

16. The telecommunications system of claim 11, wherein the video media server is further operable to provide telecommunications content by providing the content based on subscriber selected options.

17. The telecommunications system of claim 16, wherein the user equipment is a digital wireless compatible device that supports video and, the video media server is further operable to provide the telecommunications content by providing synchronized video content and audio content to the requesting user equipment if the subscriber has selected options that permit the delivery of video and audio content.

18. The telecommunications system of claim 16, wherein the video media server is further operative to provide the telecommunications content by providing synchronized video content and audio content convened into closed captioning text, synchronized video content and audio content, and audio content only to the user equipment based on the type of user equipment.

19. A method for providing messaging services to a plurality of types of user equipment, wherein some of the plurality of user equipment support video messaging and some of the plurality of user equipment do not support video messaging, the method comprising the steps of:

receiving telecommunications content that includes video content and audio content;
separating the video content from the audio content;
storing the separated video content and the audio content;
synchronizing the video content and the audio content;
receiving a request for the telecommunications content;
determining the type of user equipment initiating the request;
providing the telecommunications content to the requesting user equipment by providing synchronized video and audio content, synchronized video and closed-caption content, and audio content only based at least in part on the determination of the type of user equipment.

* * * * *

UNITED STATES PATENT AND TRADEMARK OFFICE
CERTIFICATE OF CORRECTION

PATENT NO. : 7,738,833 B2 Page 1 of 1
APPLICATION NO. : 11/307577
DATED : June 15, 2010
INVENTOR(S) : Sonny R. Bettis et al.

It is certified that error appears in the above-identified patent and that said Letters Patent is hereby corrected as shown below:

Col. 1, line 12, following the text after "ser. No. 11/170,459", please add --issued on Dec. 11, 2007 as U.S. Patent No. 7,308,083--
Col. 1, line 13, following the text after "ser. No. 11/170,530", please add --issued on Apr. 20, 2010 as U.S. Patent No. 7,701,929--
Col. 1, line 19, following the text after "U.S. patent application", please add --filed on Feb. 14, 2006 and assigned Ser. No. 11/354,255--
Col. 1, line 22, please replace the text "was filed concurrently with tis application" with --issued on Dec. 22, 2009 as U.S. Patent No. 7,636,348--
Col. 3, line 35, please replace the text "includes" with --include--
Col. 3, line 41, following the text "the present invention is to allow a" with --user--
Col. 3, line 42, please delete the word "the" between "without" and "rendering"
Col. 4, line 54, please delete the text "V" between "The" and "voice media server"
Col. 22, line 29, please replace the word "requires" with --requiring--
Col. 30, line 11 claim 18, please replace the word "convened" with --converted--

Signed and Sealed this

Twenty-first Day of December, 2010

David J. Kappos
*Director of the United States Patent and Trademark Office*